US010478848B2

(12) United States Patent
D'Andreta

(10) Patent No.: US 10,478,848 B2
(45) Date of Patent: Nov. 19, 2019

(54) APPARATUS FOR PREVENTING A COVER FROM BEING DRAWN INTO A JOINT OF A PAINT ROBOT

(71) Applicant: TD Industrial Coverings, Inc., Sterling Heights, MI (US)

(72) Inventor: Mark D'Andreta, Ortonville, MI (US)

(73) Assignee: TD INDUSTRIAL COVERINGS, INC., Sterling Heights, MI (US)

( * ) Notice: Subject to any disclaimer, the term of this patent is extended or adjusted under 35 U.S.C. 154(b) by 15 days.

(21) Appl. No.: 15/619,804

(22) Filed: Jun. 12, 2017

(65) Prior Publication Data

US 2017/0274402 A1 Sep. 28, 2017

Related U.S. Application Data

(63) Continuation of application No. 15/185,086, filed on Jun. 17, 2016, which is a continuation of application No. 14/151,050, filed on Jan. 9, 2014, now Pat. No. 10,105,727.

(51) Int. Cl.
| | |
|---|---|
| *B05B 13/04* | (2006.01) |
| *B05B 13/02* | (2006.01) |
| *B25J 19/00* | (2006.01) |
| *B05B 15/50* | (2018.01) |
| *B05C 1/06* | (2006.01) |

(52) U.S. Cl.
CPC ............. *B05B 15/50* (2018.02); *B05B 13/02* (2013.01); *B05B 13/0431* (2013.01); *B05C 1/06* (2013.01); *B25J 19/0075* (2013.01); *Y10S 901/43* (2013.01); *Y10S 901/49* (2013.01); *Y10T 24/44248* (2015.01); *Y10T 29/49826* (2015.01)

(58) Field of Classification Search
CPC . B05B 13/0431; B05B 15/04; B05B 15/0437; B05B 15/045; B05B 15/0487; Y10S 901/43; Y10S 901/49; B25J 19/0075
See application file for complete search history.

(56) References Cited

U.S. PATENT DOCUMENTS

| | | | | |
|---|---|---|---|---|
| 5,155,423 A | * | 10/1992 | Karlen | B25J 9/04 318/568.1 |
| 6,543,307 B2 | * | 4/2003 | Ambrose | B25J 19/0025 74/490.01 |
| 2006/0015214 A1 | * | 1/2006 | Sugawara | B25J 5/00 700/245 |
| 2010/0292707 A1 | * | 11/2010 | Ortmaier | B25J 19/0075 606/130 |

* cited by examiner

*Primary Examiner* — Dah-Wei D. Yuan
*Assistant Examiner* — Stephen A Kitt
(74) *Attorney, Agent, or Firm* — Stephen T. Olson; Harness, Dickey & Pierce, P.L.C.

(57) ABSTRACT

An apparatus for preventing a cover from being drawn into a joint of a paint robot includes a circular ring member mounted to the paint robot proximate the joint. The circular ring member may include first and second blocking members. The paint robot includes first and second portions rotatable relative to one another about an axis of the joint. The circular ring member circumferentially surrounds the first portion of the paint robot such that the axis of the joint passes through the circular ring member.

18 Claims, 13 Drawing Sheets

APPARATUS FOR PREVENTING A COVER FROM BEING DRAWN INTO A JOINT OF A PAINT ROBOT

CROSS-REFERENCE TO RELATED APPLICATIONS

This application claims priority to U.S. patent application Ser. No. 15/185,086 (filed 17 Jun. 2016) and U.S. patent application Ser. No. 14/151,050 (filed 9 Jan. 2014), which applications are herein expressly incorporated by reference.

FIELD

The present disclosure relates to the automated painting with paint robots. The present disclosure more particularly relates to an apparatus for preventing a cover for a paint robot from being drawn into a joint of the paint robot. The present disclosure also relates to a method for preventing a cover for a paint robot from being drawn into a joint of a paint robot.

BACKGROUND

This section provides background information related to the present disclosure which is not necessarily prior art.

Painted goods such as automobiles and the like conventionally utilize a dedicated paint area or paint room for the application of paint. The paint rooms are highly regulated to promote a quality paint finish. For example, most conventional clothing is prohibited due to the loose fibers which otherwise end up in the paint. Additionally, various lotions and other personal products are prohibited due to their adverse effect on the painting process.

In many applications, paint is applied to articles such as automobiles with automated paint robots. The robots advantageously eliminate human error, reduce labor and provide improved and repeatable quality. The application of paint with automated paint robots is necessarily associated with a degree of overspray. Some overspray of paint is required to ensure complete painting of the subject article.

It has heretofore been appreciated in the pertinent art that automated paint robots can be equipped with covers to both protect the robot and reduce paint defects. In this regard, the covers substantially shield the robots from paint overspray, thereby protecting the moving parts. Additionally, the covers prevent the accumulation of paint that may otherwise result in the dripping of paint on the subject article. The covers can be periodically discarded and replaced.

Ongoing objectives in the pertinent art include improved cover fit to facilitate freedom of robot movement. It is also an ongoing objective to reduce any interference between the cover and the operation of the paint robot.

SUMMARY

This section provides a general summary of the disclosure, and is not a comprehensive disclosure of its full scope or all of its features.

In accordance with one particular aspect, the present teachings provide an apparatus for preventing a cover from being drawn into an axis joint of a paint robot. The paint robot includes first and second portions rotatable relative to one another about the axis joint. The apparatus includes a cover blocking member in the form of a band. The apparatus further includes a mounting arrangement for fixedly securing the band to one of the first or second portions of the paint robot.

In accordance with another particular aspect, the present teachings provide an apparatus for preventing a cover from being drawn into joint of a paint robot that includes a ring member and first and second blocking members. The paint robot includes first and second portions rotatable relative to one another about an axis of the joint. The ring member circumferentially surrounding the first portion of the paint robot such that the axis of the joint passes through the ring member. The ring member includes a first portion and a second portion removably attachable to the first portion. The first and second portions of the ring member each extending through approximately 180 degrees so as to cooperatively define a complete circle. The first and second blocking members are carried by the first and second portions of the ring member, respectively. The first blocking member includes a first blocking portion axially extending from a first attachment portion. The second blocking member includes a second blocking portion axially extending from a second attachment portion. The first and second blocking portions are operative to prevent a cover from begin drawn into the axis of the point robot.

In accordance with yet another particular aspect, the present teachings provide an apparatus for preventing a cover from being drawn into joint of a paint robot. That apparatus includes first and second arcuate mounting members and first and second blocking members. The first arcuate mounting member has a first circumferential length extending through approximately 180 degrees and defining a first arcuate channel extending completely along the first circumferential length. The first arcuate channel is closed in a radial direction and open to a bottom of the first arcuate mounting member in an axial direction. The second arcuate mounting member similarly has a second circumferential length extending through approximately 180 degrees and defines a second arcuate channel extending completely along the second circumferential length. Again, the second arcuate channel is closed in the radial direction and open to a bottom of the second arcuate mounting member in the axial direction. The second arcuate mounting member is releasably attached to the first arcuate mounting member so as to cooperatively define a complete circle through which the axis extends. The first blocking member includes a first attachment portion and a first blocking portion. The first attachment portion is slidably received within the first arcuate channel. The first blocking portion includes a first plurality of bristles. The second blocking member includes a second attachment portion and a second blocking portion. The second attachment portion is slidably received within the second arcuate channel. The second blocking portion includes a second plurality of bristles.

In accordance with still yet another particular aspect, the present teachings provide a method for preventing a cover from being drawn into a joint of a paint robot. The method includes providing first and second arcuate mounting members, both of the first and second arcuate mounting members extending through approximately 180 degrees. The method additionally includes releasably engaging first and second blocking members with the first and second arcuate mounting members, respectively. The method further includes releasably securing the first and second arcuate mounting members such that the first and second mounting members define a complete circle through which the axis of the joint extends. The method still further includes rotating the first and second portions of the paint robot relative to each other with the first and second blocking members blocking the cover from being drawn into the joint.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
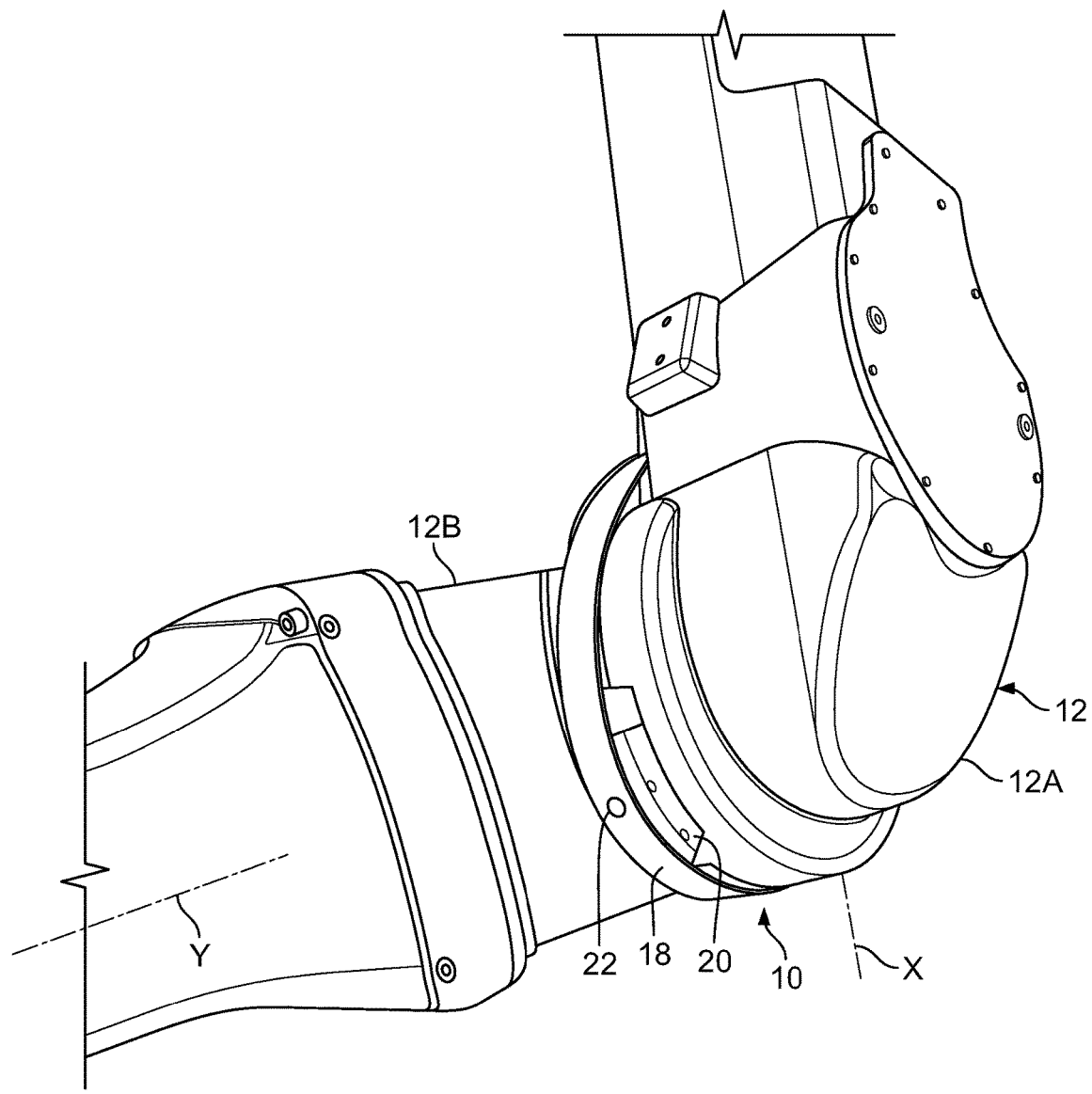
FIG. 1 is a perspective view of an apparatus according to the present teachings for preventing a cover from being drawn into a joint of the paint robot, the apparatus shown operatively associated with an exemplary paint robot.
Figure 2:
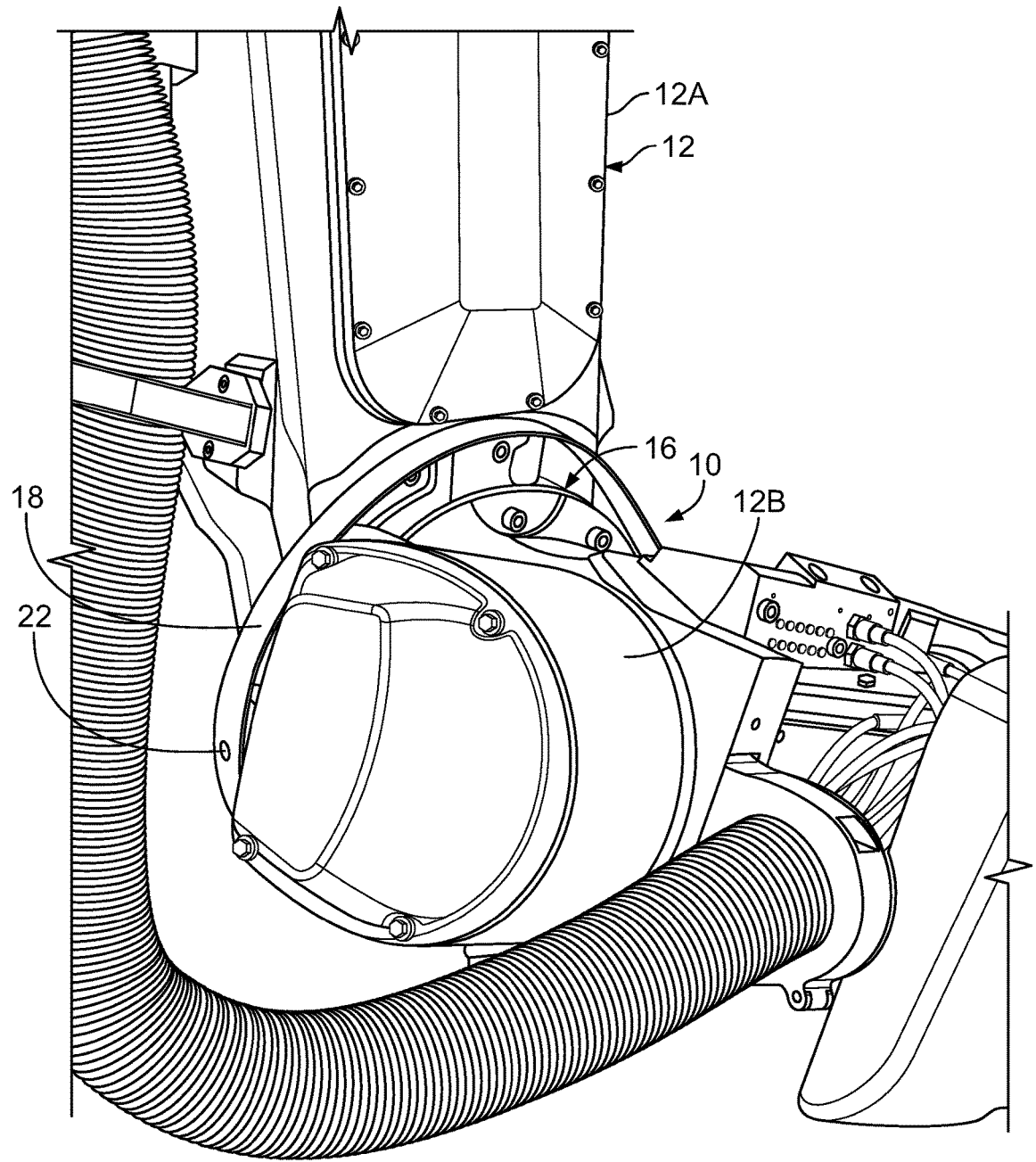
FIG. 2 is another perspective view of the apparatus for preventing a cover from being drawn into a joint of a paint robot of the present teachings and the exemplary paint robot.
Figure 3:
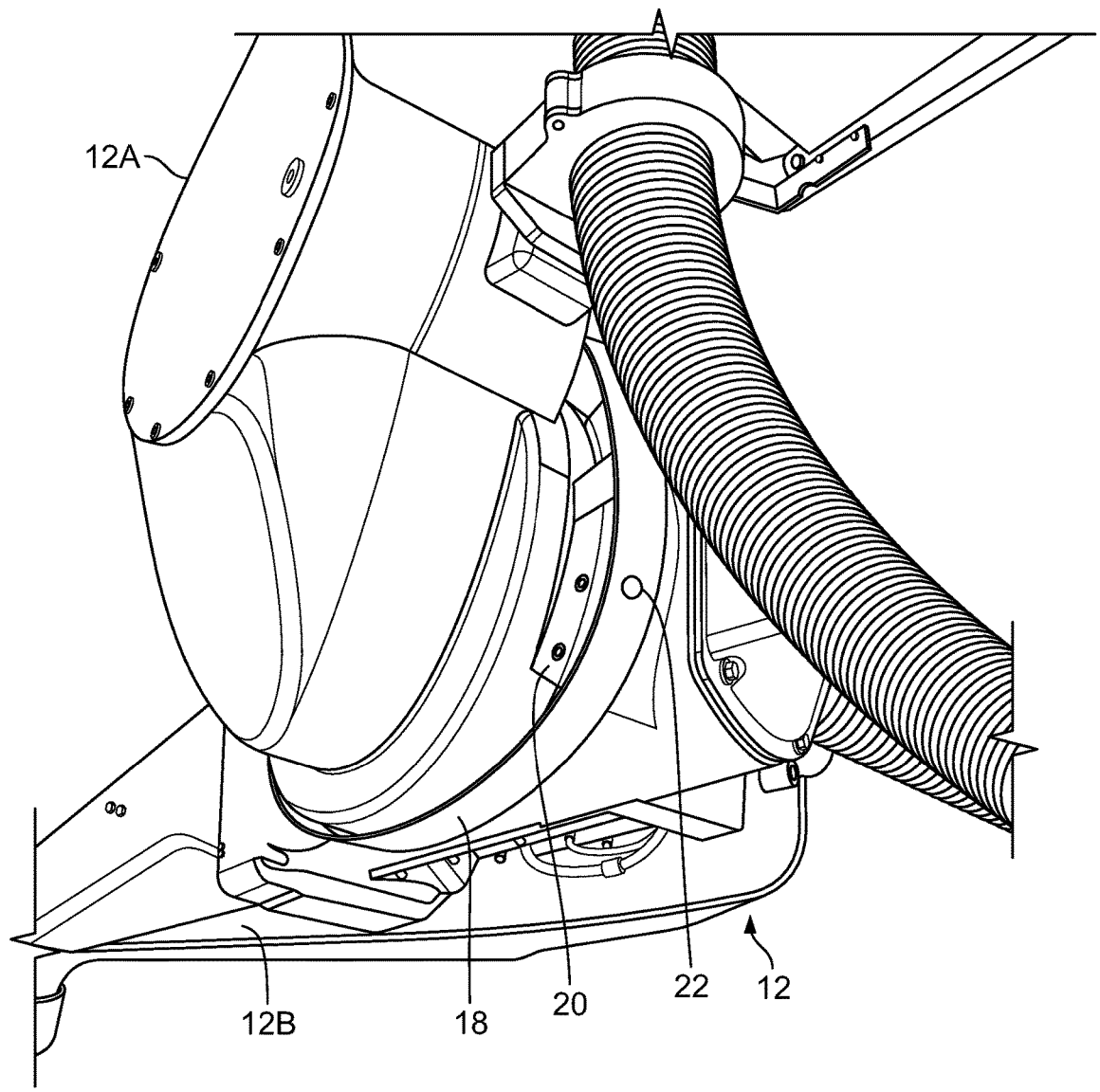
FIG. 3 is another perspective view of the apparatus for preventing a cover from being drawn into a joint of a paint robot of the present teachings and the exemplary paint robot.
Figure 4:
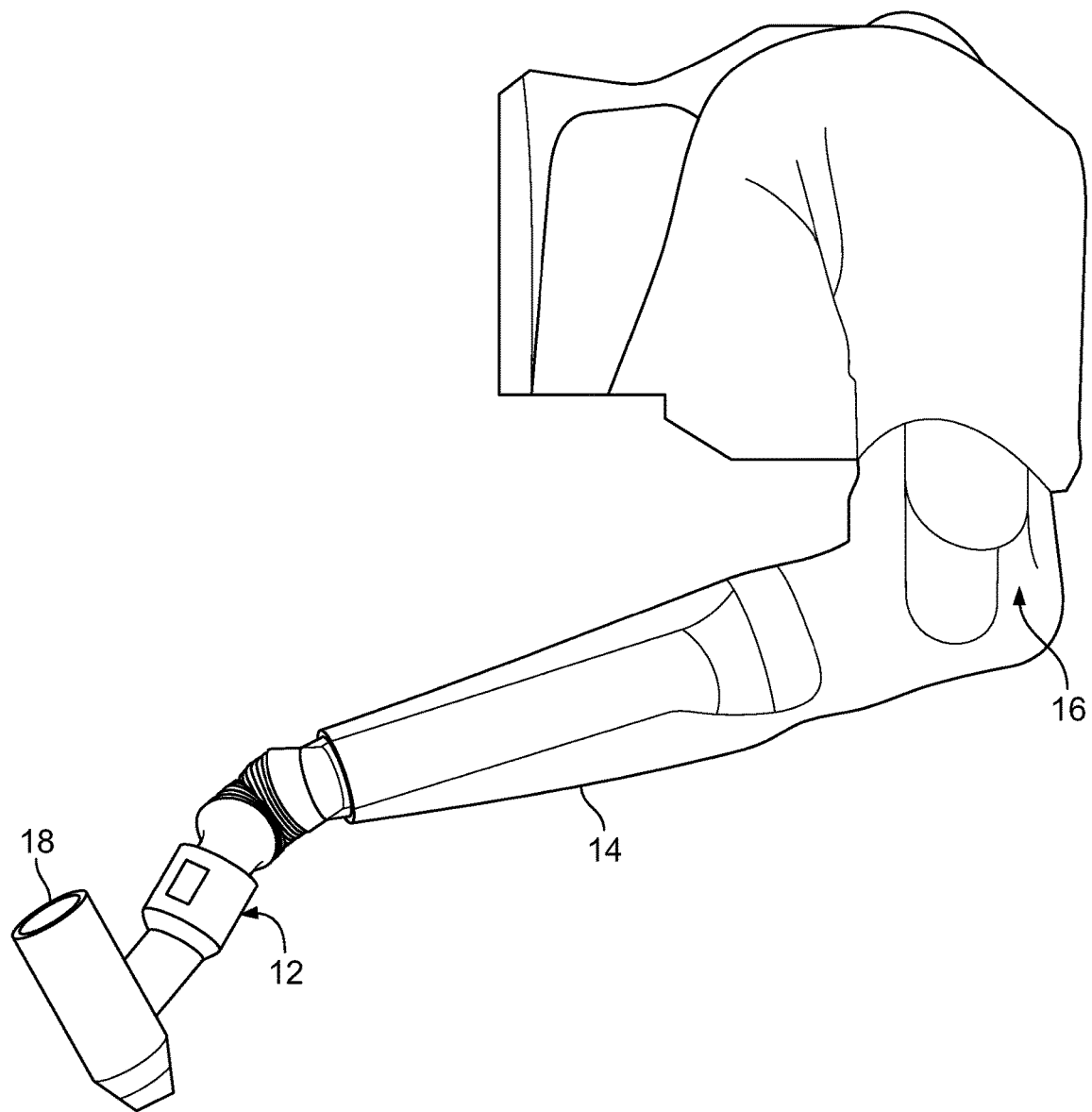
FIG. 4 is a perspective view of a paint robot of FIGS. 1-3 shown operatively associated with a cover, the apparatus of the present teachings positioned between the paint robot and the cover and thereby hidden from view.

With initial reference to FIGS. 1-4 of the drawings, an apparatus according to the present teachings for preventing the cover from being drawn into a joint of a robot is illustrated and generally identified at reference character 10. FIGS. 1-3 illustrate the apparatus 10 operatively attached to an exemplary paint robot 12. FIG. 4 illustrates the robot 12 of FIGS. 1-3 covered with a paint cover 14, the apparatus 10 of the present teachings covered by the robot 12 to prevent the cover 14 from being drawn into a joint 16 of the robot 12.

It will be understood that the robot 12 and paint cover 14 shown in the drawings are conventional in both construction and operation as far as the present teachings are concerned. It will be further understood that the present teachings may be adapted for use with various robots and covers.

The robot 12 conventionally functions to deliver a source of paint to an object such as a motor vehicle or the like. The robot 12 may be computer controlled to articulate as necessary for automated painting of the object. A terminal end of the paint robot 12 may carry a paint gun.

The paint robot 12 is capable of various movements for desired positioning of the paint gun relative to the object to be painted. Relevant to the apparatus of the present teachings, the paint robot 12 includes first and second portions 12A and 12B rotatable relative to one another. Defining one particular degree of freedom, the first and second portions 12A and 12B rotate relative to one another at the joint 16. In the embodiment illustrated, the first portion 12A of the robot extends along an axis X and the second portion 12B of the robot extends along an axis Y. An axis of rotation A (see FIG. 6) between the first and second portions 12A and 12B extends perpendicular to both of the axes X and Y.

The paint cover 14 covers at least a portion of the robot 12 including the joint 16. As particularly illustrated in FIG. 4, the cover 14 substantially covers the robot 12 and protects the robot 12 from paint overspray. In the relevant art, it is important that the paint cover 14 shield the robot 12 from overspray without interfering with the various required movements of the robot 12. Generally speaking, a relatively snug fit of the cover 14 is desired to accomplish these objectives and to avoid material (i.e., paint) waste. Various paint covers are known in the relevant art, including but not limited to the paint covers shown and described in commonly owned U.S. Publication Nos. 2006/0141200; 2004/0258877; and U.S. Design Pat. Nos. D496,952; and 491,964. U.S. Publication Nos. 2006/0141200; 2004/0258877; and U.S. Design Pat. Nos. D496,952; and 491,964 are incorporated by reference as if fully set forth herein.

The apparatus 10 of the present teachings is generally illustrated to include a blocking member 18. The blocking member 18 may be a generally circular ring or a band. In the embodiment illustrated, the blocking member 18 defines a complete ring.

In one particular application, the blocking member or ring 18 is constructed from a generally flat stock material. As shown in the drawings, the stock material may be a flexible plastic and may have a length of about 48 inches and a width of about 1.5 inches. It will be understood, however, that the dimensions may be varied within the scope of the present teachings. In this regard, the length is significantly greater than the width. The ring 18 may be configured by bending the flat stock material and securing a first end thereof to a second end thereof. Such securement may be accomplished in any suitable manner well known in the art. For example, the two ends may be welded together or secured with a fastener. It will be appreciated by those skilled in the art that other materials may be readily employed and further that the identified dimensions may be readily changed for other applications.

The flat stock material defining the blocking member 18 may be wrapped about one of the first and second portions 12A and 12B of the paint robot 12 at the painting site. Thereafter, the blocking member 18 may be fixedly secured to the one of the first and second portions 12A and 12B of the paint robot 12. As illustrated, the blocking member 18 may be concentrically positioned relative to the one of the first and second portions 12A and 12B and spaced therefrom such that the axis A of rotation A between the first and second portions 12A and 12B extends through the middle of the blocking member 18. The blocking member 18 is disposed between the joint 16 and the paint cover 14. The blocking member 18 is fixed relative to the first portion 12A of the robot 12 but unattached to the paint cover 14. Explaining further, the blocking member 18 may rotate and otherwise move freely relative to the cover 14.

The apparatus 10 of the present teachings further includes a mounting arrangement for securing the blocking member 18 to the robot 12. As illustrated, the mounting arrangement may include one or more spacers 20. Each spacer 20 may be secured to the robot 12 with a fastener 22. The fastener 22 may in turn secure the blocking member 18 to the spacer 20. In the embodiment illustrated, the mounting arrangement includes a single fastener 22 and a single spacer 20. Additional fasteners 22 and spacers 20 may be incorporated within the scope of the present teachings. It will be appreciated by those of ordinary skill in the art that various applications may omit any spacers. In this regard, the blocking member 18 may be directly attached to the robot 12. These applications are within the scope of the present teachings.

The spacer 20 is positioned between the blocking member 18 and the robot 12 to establish a desired spacing therebetween. In the embodiment illustrated, the spacing between the blocking member 18 and the robot 12 is approximately 1.5-2.0 inches. The spacing between the blocking member 18 and the robot 12 may be uniform about the robot 12 but does not need to be. The fastener 22 passes through a hole in the spacer 20 and engages a threaded aperture in the robot 12. The blocking member 18 is sufficiently rigid relative to the cover 14 to prevent the cover 14 from being drawn into the axis joint 16.

The blocking member 18 may be carried by the first portion 12A of the robot 12 proximate the joint 16. In this regard, the blocking member 18 is axially positioned close to the second portion 12B of the robot 12 but slightly spaced from the second portion 12B so as to not interfere with relative rotation therebetween.

Figure 5:
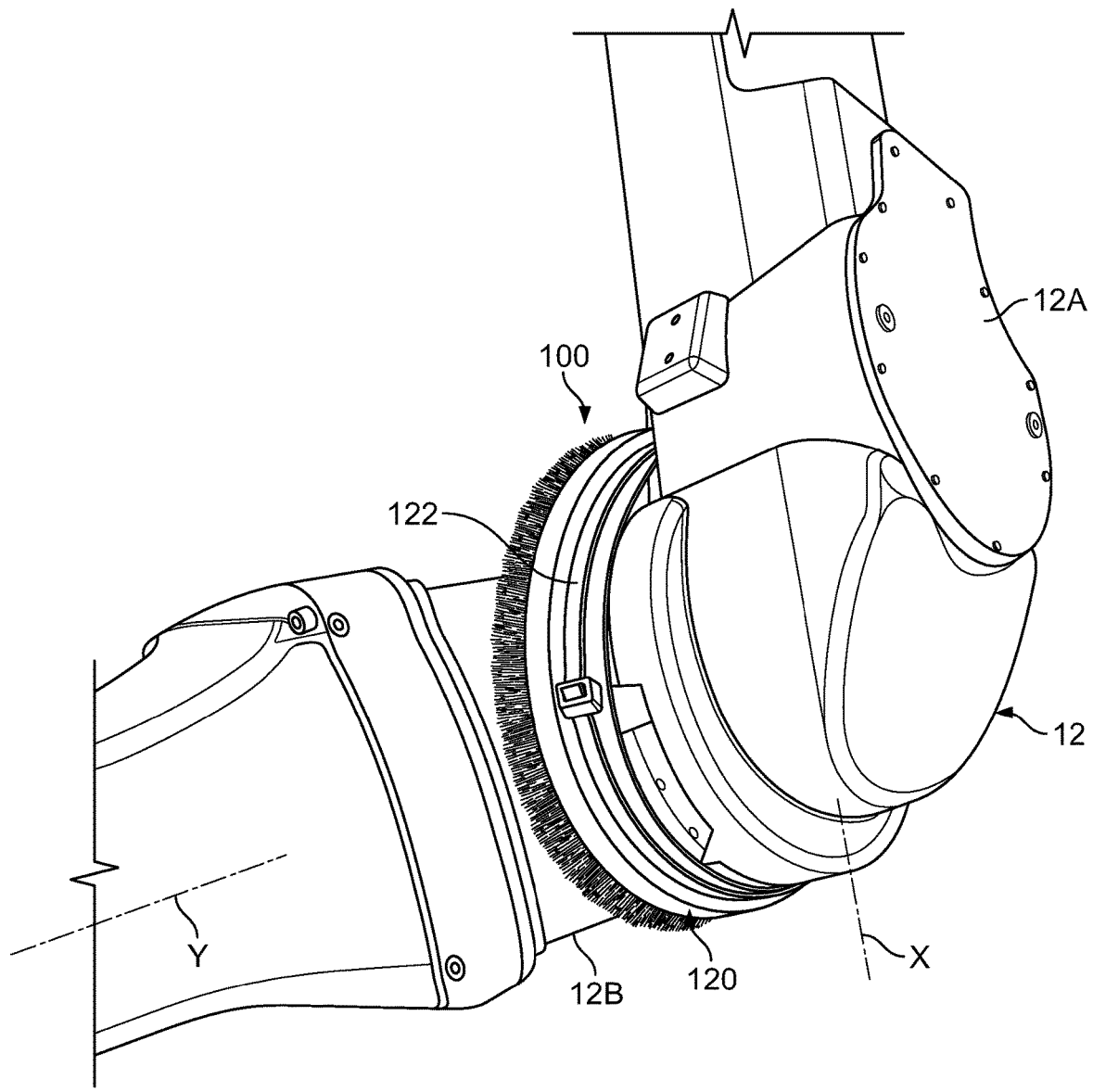
FIG. 5 is a perspective view similar to FIG. 1, illustrating another apparatus according to the present teachings for preventing a cover from being drawn into a joint of a paint robot.
Figure 6:
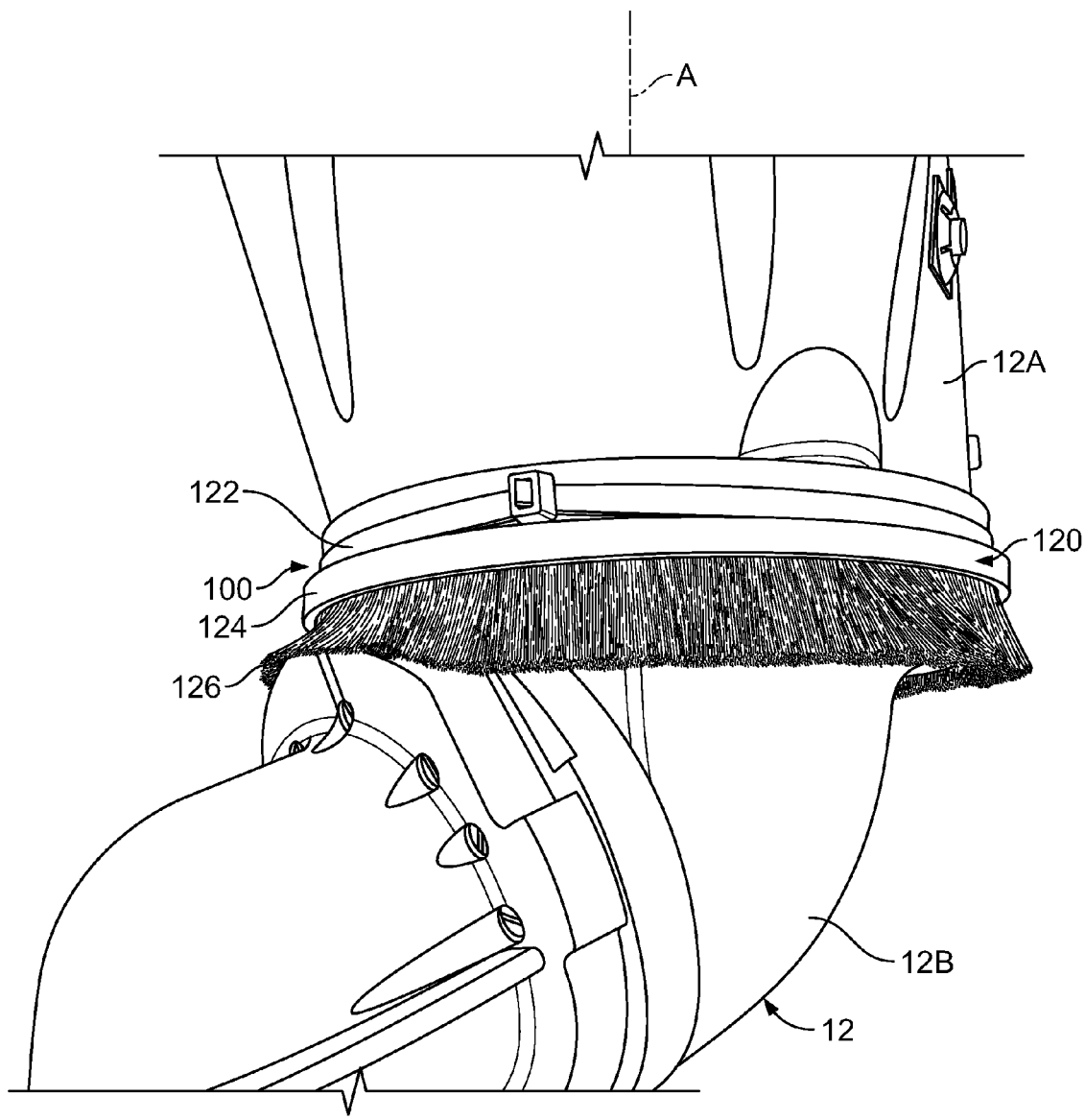
FIG. 6 is another perspective view of the apparatus for preventing a cover from being drawn into a joint of a paint robot of FIG. 5.

Turning to FIGS. 5 and 6 of the drawings, another apparatus according to the present teachings for preventing a cover 14 from being drawn into a joint 16 of a robot 12 is illustrated and generally identified at reference character 100. As with the above described embodiment, the apparatus 100 of the present teachings is positioned between the cover 14 and the robot 12 to prevent the cover 14 from being drawn into the joint of the robot 12.

The apparatus 100 of the present teachings is generally illustrated to include a blocking member 120 and a mounting arrangement 122. The blocking member 120 may be a brush such as a strip brush having a base 124 and a plurality of bristles 126 generally circular ring or a band. In the embodiment illustrated, the blocking member 120 may define a complete circle.

In one particular application, the base 124 of the blocking member 120 may be constructed from a generally flat stock material. As shown in the drawings, the stock material may be a flexible plastic and may have a length of about 48 inches and a width of about 1.5 inches, for example. It will be understood, however, that the dimensions may be varied within the scope of the present teachings. In this regard, the length is significantly greater than the width. The circular shape of the blocking members 20 may be configured by bending the flat stock material of the base 124. It will be appreciated by those skilled in the art that other materials may be readily employed and further that the identified dimensions may be readily changed for other applications. It will also be understood that the base 124 may be formed of one or more parts. One such example is provided below.

The flat stock material of the base 124 of the blocking member 120 may be wrapped about one of the first and second portions 12A and 12B of the paint robot 12 at the painting site. Thereafter, the blocking member 120 may be fixedly secured to the one of the first and second portions 12A and 12B of the paint robot 12. As illustrated, the blocking member 120 may be concentrically positioned relative to the one of the first and second portions 12A and 12B and spaced therefrom. In the embodiment illustrated, the blocking member 120 is secured to the first or proximal portion 12A of the paint robot 12. As shown in the drawings, the blocking member 120 circumferentially surrounds the rotation axis A of the joint 16. Explaining further, the rotation axis A passes through the middle of the blocking member 120. The plurality of bristles 126 may extend generally parallel to the rotation axis A.

The apparatus 100 of the present teachings may be secured to the robot 12 in any manner well known in the art. As shown, the mounting arrangement 122 for securing the blocking member 120 to the robot 12 may include a zip tie. Alternatively, the base 122 of the brush 118 may be secured to the robot 12 with fasteners.

The blocking member 120 may be carried by the first portion 12A of the robot 12 proximate the joint 16. In this regard, the blocking member 120 is axially positioned close to the second portion 12B of the robot 12 but slightly spaced from the second portion 12B so as to not interfere with relative rotation therebetween.

Figure 7:
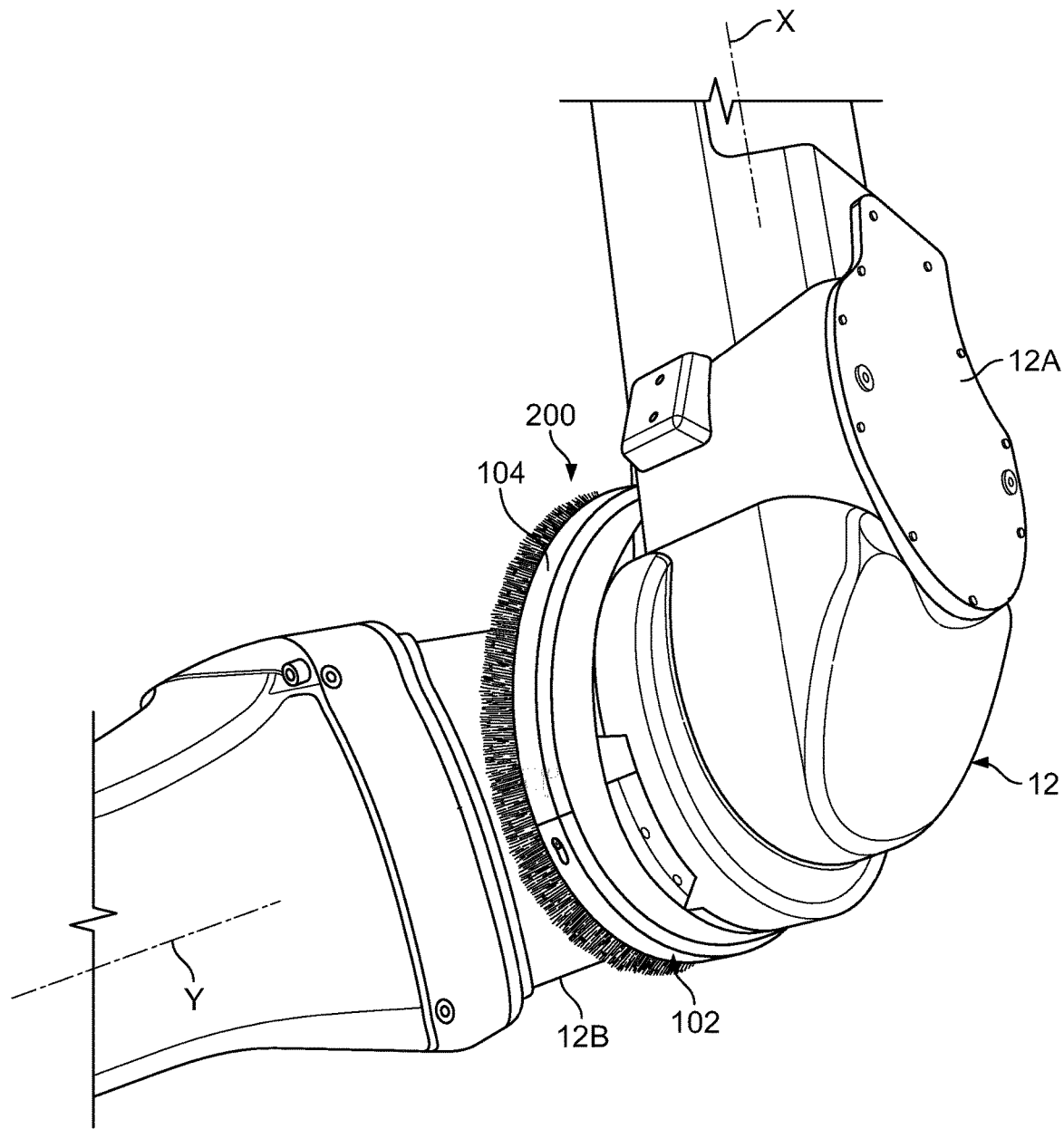
FIG. 7 is another perspective view similar to FIG. 1, illustrating another apparatus according to the present teachings for preventing a cover from being drawn into a joint of the paint robot.
Figure 8:
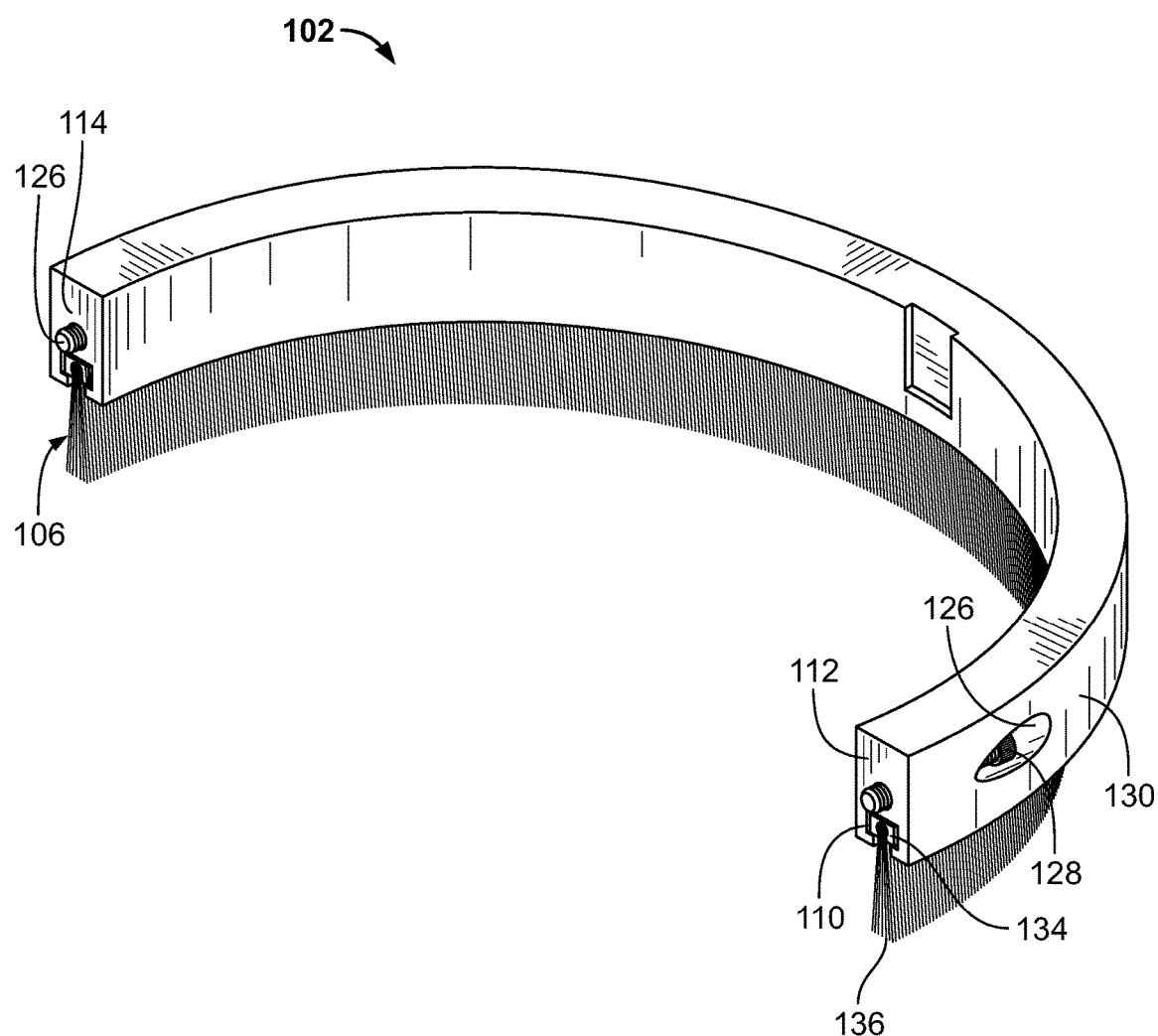
FIG. 8 is a perspective view of a portion of the apparatus of FIG. 7 including a first arcuate mounting member and a first blocking member.
Figure 9:
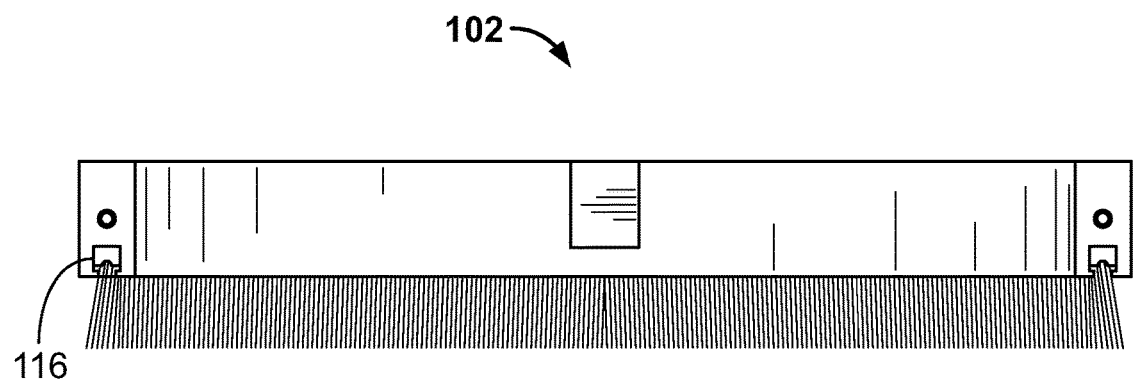
FIG. 9 is an inner side view of the portion of the apparatus of FIG. 8.
Figure 10:
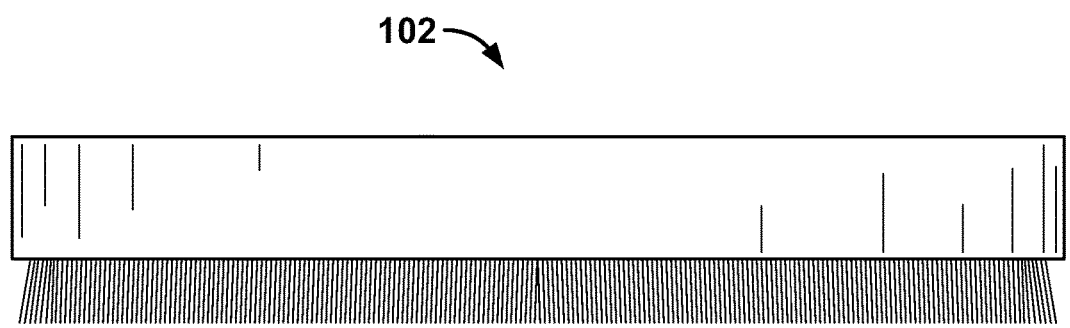
FIG. 10 is an outer side view of the portion of the apparatus of FIG. 8.
Figure 11:
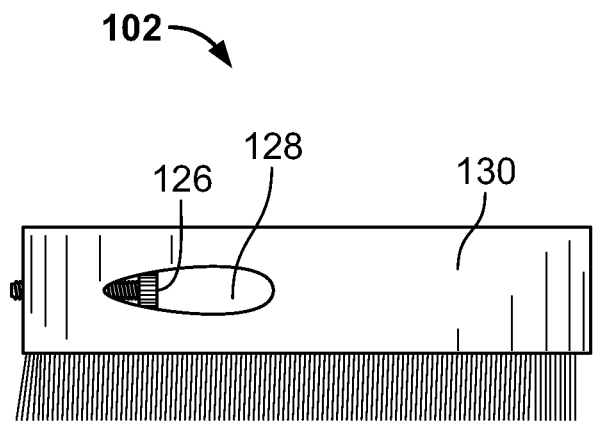
FIG. 11 is a right side view of the portion of the apparatus of FIG. 8.
Figure 12:
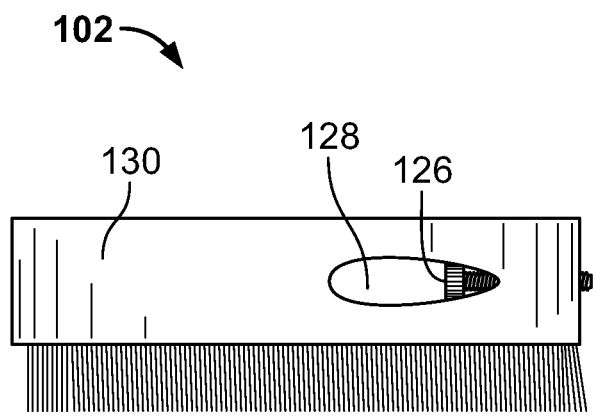
FIG. 12 is a left side view of the portion of the apparatus of FIG. 8.
Figure 13:
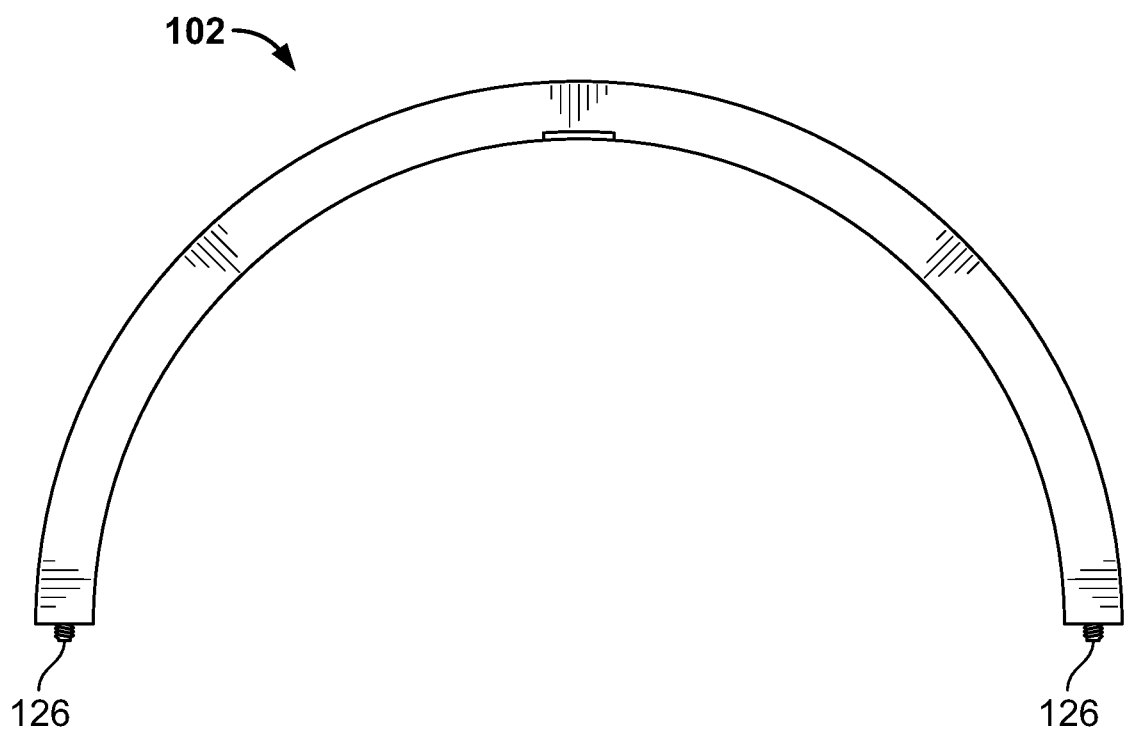
FIG. 13 is a top view of the portion of the apparatus of FIG. 8.
Figure 14:
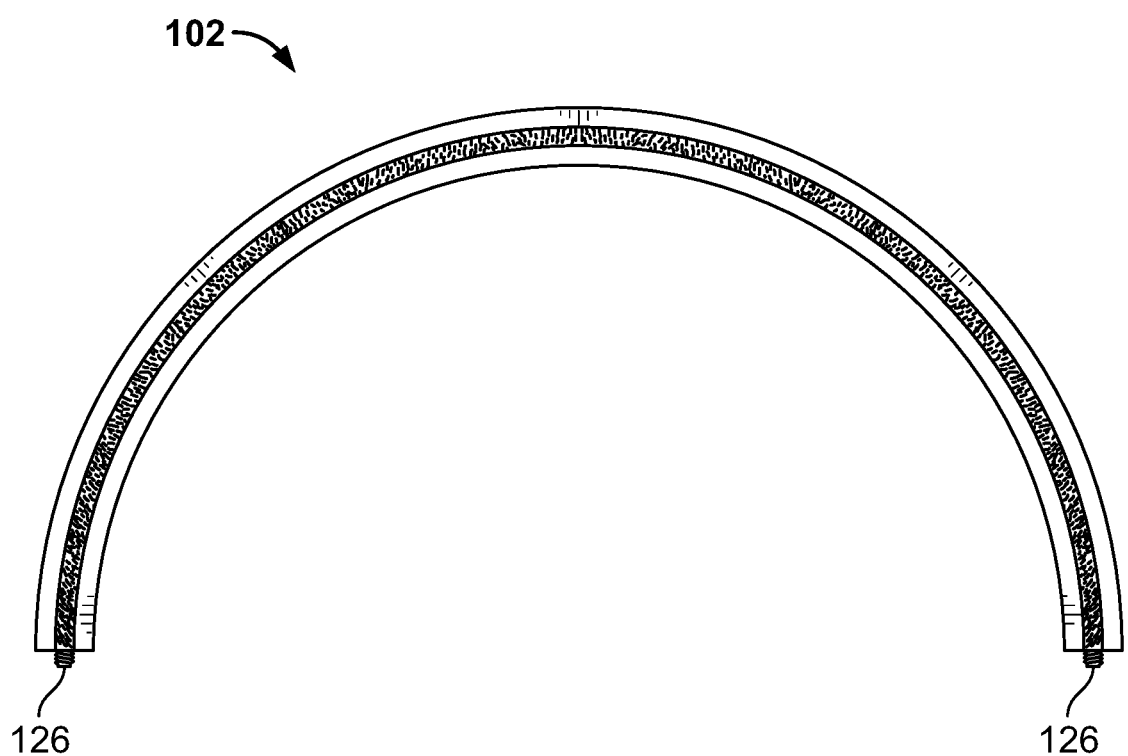
FIG. 14 is a bottom view of the portion of the apparatus of FIG. 8.
Figure 15:
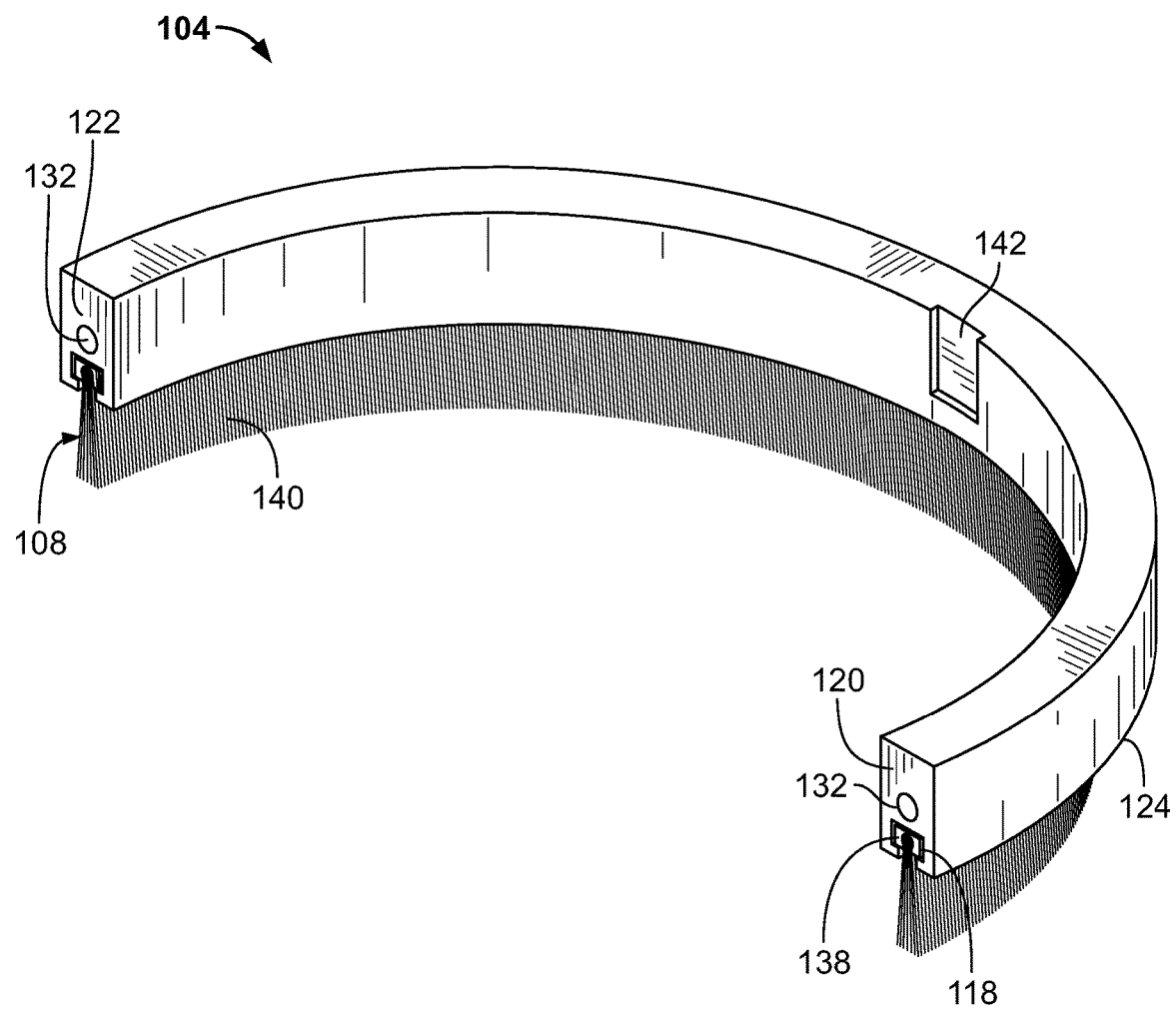
FIG. 15 is a perspective view of another portion of the apparatus of FIG. 7 including a second arcuate mounting member and a second blocking member.
Figure 16:
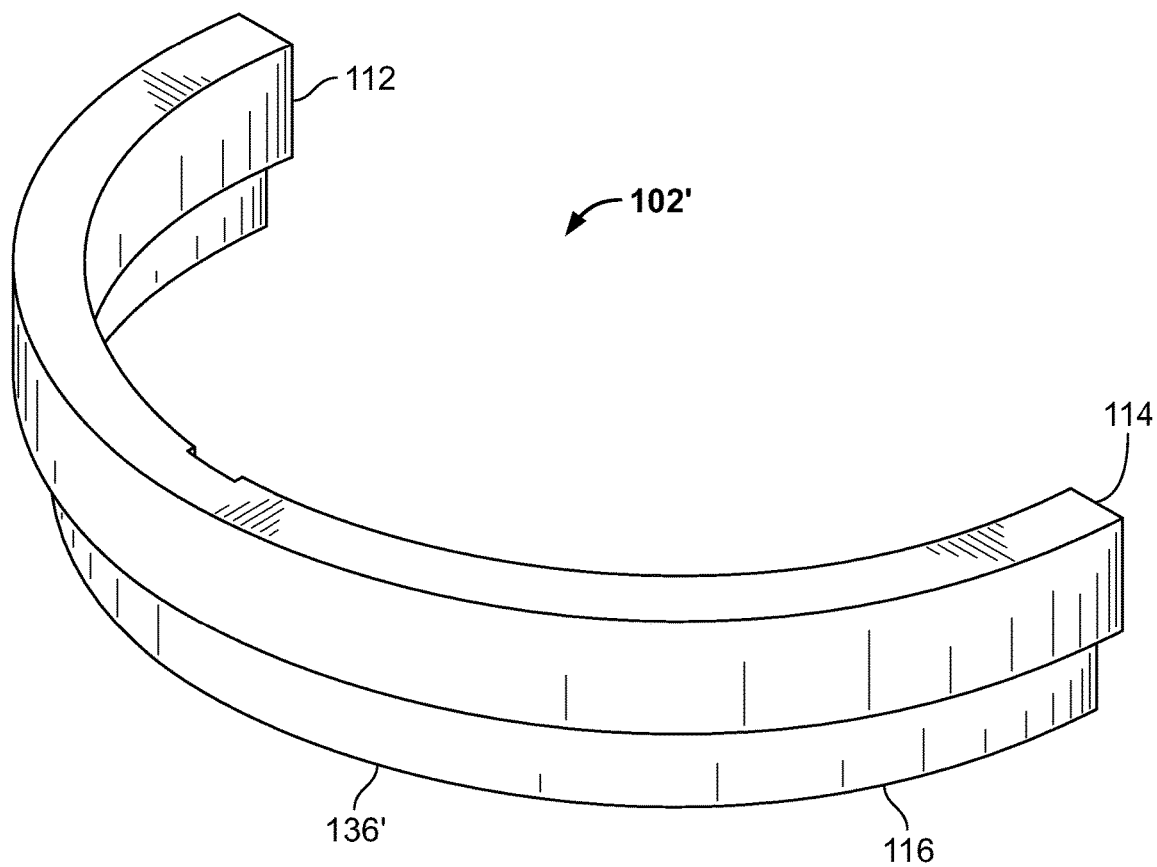
FIG. 16 illustrates alternative portion of an apparatus of the present teachings similar to FIG. 8, but alternatively incorporating a flange in place of a first plurality of bristles.

Turning to FIGS. 7-16 of the drawings, another apparatus according to another embodiment of the present teachings for preventing the cover 14 from being drawn into a joint 16 of a robot 12 is illustrated and generally identified at reference character 200. FIG. 7 is similar to FIG. 1 and illustrates the apparatus 200 operatively attached to the paint robot 12. FIGS. 8 through 15 further illustrated a first arcuate mounting member 202 of the apparatus 200. FIG. 16 further illustrates a second arcuate mounting member 204.

In addition to the first and second arcuate mounting members 102 and 104, the apparatus 200 is illustrated to generally include first and second blocking members 106 and 108. The first arcuate mounting member 102 has a first circumferential length extending through approximately 180 degrees and defines a first arcuate channel 110 extending completely along the first circumferential length. Explaining further, the first arcuate channel 110 extends from a first end 112 of the arcuate mounting member 102 to a second end 114 of the arcuate mounting member 102. The first arcuate channel 110 is closed in a radial direction and open to a bottom 116 of the first arcuate mounting member 102 in an axial direction.

The second arcuate mounting member 104 has a second circumferential length extending through approximately 180 degrees and defining a second arcuate channel 118 extending completely along the second circumferential length. As with the first arcuate channel 110, the second arcuate channel 104 extends from a first end 120 of the second arcuate mounting member 104 to a second end 122 of the second arcuate mounting member 104, is closed in the radial direction and open to a bottom 124 of the second arcuate mounting member 104 in the axial direction. The second arcuate mounting member 104 is releasably attached to the first arcuate mounting member 102 so as to cooperatively define a mounting ring that extends through a complete circle through which the axis A extends.

In the embodiment illustrated, the first arcuate mounting member 102 and 104 are releasably attachable to one another with a pair of fasteners 126. As illustrated, the first arcuate member 102 is recessed openings 128 in an outer wall 130. The recessed openings 128 receive the fasteners 126 which exit from a respective end 112, 114 of the first arcuate mounting member 102. The fasteners 126 may threadably engage threaded holes 132 in the ends 120, 122 of the second arcuate mounting member 104.

The first blocking member 106 including a first attachment portion 134 and a first blocking portion 136. In the embodiment illustrated, the first attachment portion 134 of the first blocking member 106 is constructed of a flexible material. In this regard, the first attachment portion 134 may be normally in a flat condition (not shown) and may be articulated to an arcuate condition (as shown in the drawings). This allows the first attachment portion 134 to be slidably received within the first arcuate channel 110.

In the embodiment illustrated, the first blocking portion 136 is shown to include a first plurality of bristles. The bristles axially extend from the bottom of the first arcuate mounting member 102 in a direction generally parallel to the axis A. Alternatively, and as shown in FIG. 16, an alternative first arcuate mounting member 102' may include a first blocking portion 136' defined by a flange. Again, the flange may axially extend from the bottom of the first arcuate mounting member 102' in a direction generally parallel to the axis A.

The second blocking member 108 will be understood to be identical to the first blocking member 102. In this regard, the second blocking member 108 generally includes a second mounting portion 138 and a second blocking portion 140. The second blocking portion 138 includes a second attachment portion.

In use, the first and second arcuate mounting member 102 and 104 are positioned about the first portion 12A of the paint robot 12. The mounting members 102 and 104 are secured to another and the resulting ring is non-rotatably carried by the first portion 12A of the robot 12. One or both of the mounting members 102, 104 may define a recess 142 (see FIG. 12, for example, for receiving a corresponding feature of the robot 12 so that the apparatus 200 does not rotate relative to the first portion 12A of the robot. The blocking members 106 and 108 may be easily removed and replaced as necessary.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for preventing a cover from being drawn into a joint of a paint robot, the paint robot including first and second portions rotatable relative to one another about an axis of the joint, the apparatus comprising:
    a mounting ring for circumferentially surrounding the first portion of the paint robot such that the axis passes through the mounting ring, the mounting ring including a first portion and a second portion removably attachable to the first portion, the first and second portions of the mounting ring each extending through approximately 180 degrees so as to cooperatively define a complete circle; and
    first and second blocking members carried by the first and second portions of the mounting ring, respectively, the first blocking member including a first blocking portion axially extending from a first attachment portion, the second blocking member including a second blocking portion axially extending from a second attachment portion, the first and second blocking portions operative to prevent a cover from begin drawn into the joint of the paint robot,
    wherein the first and second blocking members include a first plurality of bristles and a second plurality of bristles, respectively, each bristle of the first and second pluralities of bristles extending generally parallel to the axis, and
    wherein the first and second pluralities of bristles are configured to prevent the cover from being drawn into the joint of the paint robot.

2. The apparatus for preventing a cover from being drawn into a joint of a paint robot of claim 1, wherein the first and second blocking members cooperate to define a complete circle.

3. The apparatus for preventing a cover from being drawn into a joint of a paint robot of claim 1, wherein the first and second portions define first and second arcuate channels, respectively, the first and second arcuate channels receiving the first and second attachment portions, respectively.

4. The apparatus for preventing a cover from being drawn into a joint of a paint robot of claim 1, in combination with the robot.

5. The apparatus for preventing a cover from being drawn into a joint of a paint robot of claim 1, wherein the circle cooperatively defined by the first and second portions lies in a plane, the plurality of bristles of the first and second blocking members extending generally perpendicular to the plane.

6. The apparatus for preventing a cover from being drawn into a joint of a paint robot of claim 1, wherein the first and second blocking members both include a flange axially extending away from the respective mounting member.

7. The apparatus for preventing a cover from being drawn into a joint of a paint robot of claim 1, wherein the first portion is removably secured to the second portion with a pair of fasteners.

8. An apparatus for preventing a cover from being drawn into a joint of a paint robot, the paint robot including first and second portions rotatable relative to one another about an axis of the joint, the apparatus comprising:
    a first arcuate mounting member having a first circumferential length extending through approximately 180 degrees and defining a first arcuate channel extending completely along the first circumferential length, the first arcuate channel closed in a radial direction and open to a bottom of the first arcuate mounting member in an axial direction;
    a second arcuate mounting member having a second circumferential length extending through approximately 180 degrees and defining a second arcuate channel extending completely along the second circumferential length, the second arcuate channel closed in the radial direction and open to a bottom of the second arcuate mounting member in the axial direction, the second arcuate mounting member releasably attached to the first arcuate mounting member so as to cooperatively defining a mounting ring that extends through a complete circle through which the axis extends;
    a first blocking member including a first attachment portion and a first blocking portion, the first attachment portion slidably received within the first arcuate channel, the first blocking portion; and
    a second blocking member including a second attachment portion and a second blocking portion, the second attachment portion slidably received within the second arcuate channel, the second blocking portion,
    wherein the first and second blocking portions include a first plurality of bristles and a second plurality of bristles, respectively, each bristle of the first and second pluralities of bristles extending generally parallel to the axis, and
    wherein the first and second pluralities of bristles are configured to prevent the cover from being drawn into the joint of the paint robot.

9. The apparatus for preventing a cover from being drawn into a joint of a paint robot of claim 8, wherein the first and second blocking members cooperate to define a complete circle.

10. The apparatus for preventing a cover from being drawn into a joint of a paint robot of claim 8, in combination with the robot.

11. The apparatus for preventing a cover from being drawn into a joint of a paint robot of claim 8, wherein the circle cooperatively defined by the first and second mounting members lies in a plane, the first and second pluralities of bristles of the first and second blocking members, respectively, extending generally perpendicular to the plane.

12. The apparatus for preventing a cover from being drawn into a joint of a paint robot of claim 8, wherein the first portion is removably secured to the second portion with a pair of fasteners.

13. An apparatus for preventing a cover from being drawn into a joint of a paint robot having an axis of rotation in combination with the paint robot, the paint robot including first and second portions rotatable relative to one another about the axis of rotation of the joint, the apparatus comprising:
- a circular ring member for circumferentially surrounding the axis;
- a mounting arrangement for fixedly securing the circular ring to one of the first and second portions of the paint robot proximate the joint; and
- a plurality of bristles, each bristle of the plurality of bristles extending generally parallel to the axis,
- wherein the axis of rotation of the joint extends through the circular ring, and
- wherein the plurality of bristles is configured to prevent the cover from being drawn into the joint of the paint robot.

14. The apparatus of claim 13, wherein the ring defines a complete circle.

15. The apparatus of claim 13, in combination with an arrangement for automated painting of an object, the arrangement comprising:
- the paint robot including first and second portions rotatable relative to one another about the joint; and
- a cover covering at least a portion of the paint robot;
- wherein the circular ring is carried by the paint robot and positioned between the paint robot and the cover.

16. The arrangement for automated painting of an object of claim 15, wherein the circular ring is operative to prevent the cover from being drawn into the joint.

17. The arrangement for automated painting of an object of claim 15, wherein the circular ring surrounds one of the first and second portions of the paint robot proximate the joint where the cover is likely to be drawn in.

18. The arrangement for automated painting of an object of claim 15, wherein the circular ring is fixedly secured to one of the first and second portions of the paint robot and concentrically oriented to a circular portion thereof.

* * * * *